Sept. 14, 1965 E. Y. BENNETT, JR 3,206,695
OVERVOLTAGE PROTECTION CIRCUIT FOR POWER CONVERTERS
Filed Nov. 13, 1961
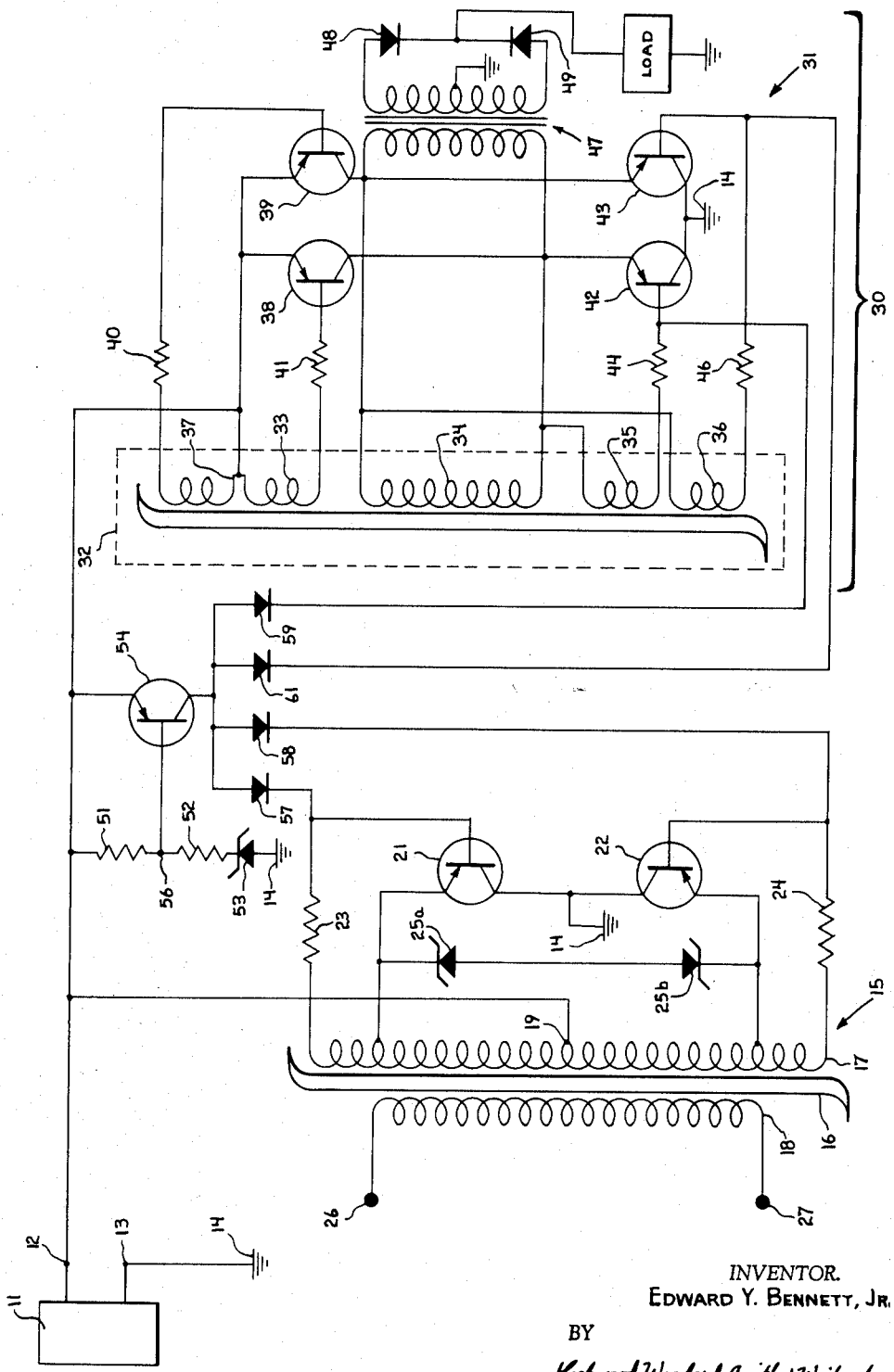
INVENTOR.
EDWARD Y. BENNETT, JR.
BY
Lockwood, Woodard, Smith & Weikart
Attorneys United States Patent Office
3,206,695
Patented Sept. 14, 1965

3,206,695
OVERVOLTAGE PROTECTION CIRCUIT FOR POWER CONVERTERS
Edward Y. Bennett, Jr., New Haven, Ind., assignor to The Magnavox Company, Fort Wayne, Ind., a corporation of Delaware
Filed Nov. 13, 1961, Ser. No. 151,701
5 Claims. (Cl. 331—62)

This invention relates generally to voltage protection and more particularly to a circuit for protection of transistors from transients occurring in the power supply thereto, particularly in connection with power converters.

In many instances where transistor circuits are employed and particularly where the transistor circuits are connected to either an unregulated power supply or to a power supply subject to transient excessive voltages, it is necessary to provide special protection for the transistors against damage which would otherwise be caused by the transients. Moreover, it frequently is desirable to provide a single simple circuit means capable of protecting transistors in several circuits energized by a single power supply.

It is, therefore, a general object of this invention to protect transistors in circuits from transients in the source of energy for the circuits.

It is a further object of this invention to protect the transistors from excessive voltages.

A further object of this invention is to provide simple circuit means whereby transistors in several circuits coupled to the same source of power can be protected against transients.

It is a still further object of this invention to provide means of the foregoing character particularly suited to protection of transistors in D.C. to D.C. or D.C. to A.C. power converters.

This invention includes in its scope a series circuit branch connected across a power supply and including in series, a biasing resistor, a current limiting resistor, and a Zener diode. A transistor is used in a switching application and having its base electrode connected to the junction of the two aforementioned resistors, its emitter electrode connected to one terminal of the power supply and its collector electrode connected through a blocking diode to the base electrode of the transistor or transistors to be protected. The switching transistor is biased for non-conduction at normal power supply voltages. The Zener diode is selected to have a voltage slightly less than the safe operating voltage of the circuit using the transistor to be protected.

Upon occurrence of a transient over-voltage, the Zener diode begins to conduct when the Zener voltage is exceeded. This turns on the switching transistor, whereupon a signal voltage is fed to the base of each transistor to be protected to turn off the latter transistors and maintain the "off" condition until the transient has disappeared. Consequently, the transistors in the protected circuit cannot be damaged by excessive currents which would otherwise result if they were in the "on" condition during occurrence of the transient.

The full nature of the invention will be understood from the accompanying drawing and the following description and claims.

The single figure of drawing illustrates a preferred embodiment of the present invention applied to the protection of a pair of power converters.

Referring to the drawing, a direct current power supply 11 provides a positive voltage output at terminal 12, the negative terminal 13 being connected to ground 14. A D.C. to A.C. power converter 15 is connected across the power supply and includes a transformer 16 having primary and secondary windings 17 and 18, respectively. The primary winding 17 has a center tap 19 connected to terminal 12 of the power supply. The circuit to ground from the primary winding is completed through a multivibrator.

The multivibrator includes PNP transistors 21 and 22 having their collector electrodes connected in common to ground. The emitters of the transistors are connected to taps in the primary winding 17, and the base electrodes of the transistors are connected through the bias resistances 23 and 24 to the ends of the primary winding 17. Two Zener diodes 25a, 25b, of 68 volt rating, for example, are connected between the emitters of transistors 21 and 22 to avoid damage to these transistors by inductive "kick" which may be produced in winding 17 when one of the transistors is turned off. The secondary winding 18 provides an A.C. output across terminals 26 and 27.

A D.C. to D.C. power converter 30 is also shown connected across the power supply 11. Converter 30 includes the solid state, bridge type, magnetically coupled multivibrator 31. This multivibrator includes a driver transformer 32 having four separate windings 33, 34, 35 and 36, winding 33 having a center tap 37. PNP transistors 38 and 39 have emitters connected in common to terminal 12 of the power supply and also to the center tap 37 of the winding 33. The base electrodes of transistors 38 and 39 are connected through bias resistances 41 and 40, respectively, to the ends of winding 33. The collector electrodes of transistors 38 and 39 are connected to each other through winding 34.

A second pair of PNP transistors is provided in multivibrator 31, transistor 42 having an emitter connected to the collector of transistor 38 and transistor 43 having an emitter connected to the collector of transistor 39. The collectors of transistors 42 and 43 are connected in common to ground. The base electrode of transistor 42 is connected through bias resistance 44 and winding 35 to the emitter thereof. The base electrode of transistor 43 is connected through resistance 46 and winding 36 to the collector of transistor 39. D.C. to A.C. conversion is provided by transformer 47 having its primary winding connected across winding 34. Conversion back to D.C. is provided by diodes 48 and 49 connected across the secondary of transformer 47. A D.C. load is shown connected from the junction of diodes 48, 49 to ground.

The principal portion of the present invention includes a biasing resistance 51, a current limiting resistance 52 and a normally unidirectional means 53, preferably a Zener diode, in a series combination across the power supply. The Zener diode is oriented with its normally high resistance in a direction to oppose the flow of positive current from the terminal 12 through the Zener diode to ground. A PNP transistor 54 is provided in a switching application with the emitter thereof connected to terminal 12 of the power supply. The base electrode of transistor 54 is connected to the junction 56 between resistances 51 and 52. The collector electrode is coupled to the base electrode of each of the transistors 21, 22, 42 and 43 through the blocking diodes 57, 58, 59 and 61, respectively. Each of the blocking diodes is oriented for low resistance to the flow of positive current in the direction from the collector of transistor 54 toward the base of the transistor to which the diode is connected.

The operation of the invention will be most readily understood if an example is given using a power supply voltage which has been frequently used in the practical application of the invention. With a nominal 30 volt D.C. input to the converters from the power supply 11, it is desirable to select a Zener diode having a Zener voltage several volts below the safe operating voltage to the D.C.

converter. Assuming that the safe operating input voltage for the converters is 36 volts, the Zener voltage may be 33 volts, for example.

Under normal operating conditions transistor 54 is non-conducting, inasmuch as the resistance 51 causes it to be biased in the "off" condition. If a transient occurs at the input terminals to raise the input voltage above the Zener voltage, current will flow through the base-emitter junction of transistor 54, through resistor 52 and the Zener diode 53 to ground. This turns on transistor 54 which provides a signal at its collector which passes through the blocking diodes to the base electrodes of the transistors connected thereto. Any of these transistors which happens to be in the "on" condition at the time is thereby turned off. Those transistors already in the "off" condition upon occurrence of the transient, are maintained in the "off" condition during the presence of the transient. Accordingly, the present invention provides transient voltage protection up to and including the minimum BVcbo and/or BVcer of the transistors being protected. BVcbo as used herein means the collector to base breakdown voltage and the BVcer means the collector to emitter breakdown voltage.

As an example of the type of protection which may be obtained in a typical circuit, assume the following values for components:

Resistance 51 _____ohms__ 25.
Resistance 52 _____do____ 30.
Zener diode 53 _____ 10M33Z5.
Blocking diodes 57, 58, 59 and 61 _____ IN547.
Transistor 54 _____ 2N1045-1.
Transistors 21, 22 _____ 2N1653.
Transistors 38, 39, 42 and 43 _____ 2N1751.

With the protection afforded by the present invention and a 30 volt power supply, the converter circuit transistors will stand transient voltages of 75 volts total.

The examples given above should be understood to be examples only and not a limitation on the present invention, as many other values can also be provided as desired within the scope of the invention.

While the invention has been disclosed and described in some detail in the drawing and foregoing description, they are to be considered as illustrative and not restrictive in character, as modifications may readily suggest themselves to persons skilled in this art and within the broad scope of the invention, reference being had to the appended claims.

The invention claimed is:

1. Electronic circuitry comprising:

a source of direct current electrical energy having a first output terminal and having a second output terminal connected to a ground;

a load device connected across said source and including a first electron discharge device having a control electrode and first and second load electrodes, said second load electrode being connected to ground and said first load electrode being connected through first impedance means to said first output terminal, and said load device further including means coupled to said control electrode and periodically changing the conducting state of said first electron discharge device;

and means for protecting said first electron discharge device from transient energy damage and including a normally non-conducting unidirectional means having high resistance to current flow therethrough in one direction at voltages thereacross below a predetermined value and having one terminal connected through resistance means to said first output terminal of said source and another terminal connected to ground;

and said protecting means including a second electron discharge device having a first electrode coupled to the first output terminal of said energy source, a second electrode coupled through a portion of said resistance means to said unidirectional means, and a third electrode coupled to the control electrode of said first discharge device, said unidirectional means normally keeping said second electron discharge device non-conducting;

the coupling of said first electrode to said source and said second electrode to said unidirectional device and the orientation of said unidirectional device being such that a voltage in said source causing a voltage exceeding said predetermined value across said unidirectional means initiates current flow through said unidirectional means in the high resistance direction rendering said second electron discharge device conductive to produce a signal at said third electrode cutting off conduction of said first electron discharge device during the presence of said exceeding voltage.

2. Electronic circuitry comprising:

a source of direct current electrical energy with first and second output terminals and providing an electrical potential thereacross;

a load device connected across said source and including a first solid state switching device operating normally in a repetitive switching manner, said switching device having one electrode connected to said first terminal and another electrode connected to said second terminal, and said switching device having a control electrode;

and means for protecting said switching device from transient energy damage and including a normally non-conducting unidirectional means having high resistance to current flow therethrough in one direction at voltages thereacross below a predetermined level;

and said protecting means including a second solid state switching device having a first electrode coupled to said first terminal of said energy source and a control electrode coupled through resistive means to said first terminal and through said unidirectional means to said second terminal, thereby establishing a normally non-conducting control circuit for said second switching device, and said second switching device having a third electrode coupled to the control electrode of said first switching device, said second switching device preventing current flow from said first terminal through said third electrode to the control electrode of said first switching device when said control circuit of said second switching device is non-conducting, and said switching device permitting current flow from said first terminal through said third electrode to the control electrode of said first switching device when said control circuit conducts current through said unidirectional means, whereby a transient voltage in said source causing excess voltage above said predetermined level in said unidirectional means initiates current flow through said unidirectional means in the high resistance direction to permit current flow through the third electrode of said second switching device to apply potential from said first terminal to said control electrode of said first switching device to cause non-conduction in said first switching device during presence of the transient voltage.

3. In electronic circuitry, the combination comprising:

a source of direct current electrical energy having first and second output terminals and providing a potential thereacross;

a first switching transistor having an emitter, a collector, and a base, the emitter-collector path of said first transistor being in a series circuit branch connected across said terminals;

signal applying means connected to the base of said first transistor and periodically switching said first transistor on and off;

and means for protecting said transistor from transient energy damage and comprising;

a Zener diode;

a second transistor having an emitter coupled to said first terminal of said energy source, a base coupled through resistive means to said first terminal and also coupled to the region of said Zener diode having the same conductivity type as that of said base of said second transistor, the other region of said Zener diode being coupled to the said second terminal of said source, the polarity of said Zener diode being related to the polarity of the potential across said terminals such that said Zener diode is normally non-conducting thereby preventing current flow in the base of said second transistor, and said second transistor having a collector;

a second diode coupling the collector of said second transistor to the base of said first transistor, said second diode being oriented to provide low resistance to the flow of positive current from said collector of said second transistor to the base of said first transistor;

whereby a voltage at said source producing a voltage across said Zener diode in excess of the Zener voltage thereof initiates current flow in the emitter-base path of said second transistor to produce a signal from the collector thereof to the base of said first transistor to cut off said first transistor and maintain non-conduction of said first transistor during said excess voltage.

4. In electronic circuitry, the combination comprising:

a source of direct current electrical energy having first and second output terminals and providing an electrical potential thereacross;

a first transistor having an emitter and collector and a base, with the emitter-collector path thereof in series circuit means connected across said terminals;

means connected to the base of said first transistor and periodically switching said transistor between a conducting state and a non-conducting state;

means for protecting said transistor from transient energy and comprising:

a biasing resistor, a current limiting resistor, and a Zener diode in a series combination connected across said terminals of said source of electrical energy;

and a second, normally non-conducting, transistor having an emitter connected to said first terminal, a base connected to a junction between said biasing resistor and said current limiting resistor, and a collector, said Zener diode being oriented to normally prevent conduction through said second transistor and thereby holding the potential of said junction at a level keeping said second transistor non-conducting;

a blocking diode connected between said collector of said second transistor and the base of said first transistor;

the Zener voltage of said Zener diode being slightly less than the safe operating voltage of said first transistor, whereby a transient voltage at said source exceeding the Zener voltage initiates conduction of said Zener diode turning on said second transistor and applying a signal from said first terminal through said blocking diode to the base of said first transistor to turn off said first transistor and keeping said first transistor turned off during the presence of said transient voltage.

5. In electric power converter circuitry, the combination comprising:

a source of direct current electrical energy having first and second output terminals and providing an electrical potential thereacross;

a multivibrator having at least a first and a second transistor, each transistor having load electrodes in a circuit branch connected across said terminals, and each having a control electrode, said transistors switching periodically and alternately between conducting and non-conducting states;

means for protecting said transistors from transient energy damage and comprising;

a biasing resistor, a current limiting resistor, and a Zener diode in series combination connected across said terminals of said source of electrical energy, said diode being oriented in said series combination to prevent conduction therethrough during presence of normal potentials across said terminals;

a third transistor having a first electrode connected to said energy source, a base electrode connected to a junction between said biasing resistor and said current limiting resistor, and a third electrode, said Zener diode keeping said third transistor turned off during presence of normal potentials across said terminals;

first and second blocking diodes, said first blocking diode being connected between said third electrode and the base of said first transistor and said second blocking diode being connected between said third electrode and the base of said second transistor;

the Zener voltage of said Zener diode being slightly less than the safe operating voltage of said first and second transistors of the multivibrator, whereby a transient voltage in excess of the safe operating voltage initiates conduction of said Zener diode to turn on said third transistor for applying a signal from said source through said blocking diodes to the control electrodes of said first and second transistors to maintain said first and second transistors in the off condition during occurrence of the transient.

References Cited by the Examiner

UNITED STATES PATENTS

| 2,971,102 | 2/61 | Schultz | 323—22 |
| 3,037,158 | 5/62 | Schmidt | 331—62 X |
| 3,042,875 | 7/62 | Higginbotham | 330—19 X |
| 3,048,718 | 8/62 | Starzec et al. | 307—93 |
| 3,067,378 | 12/62 | Paynter | 307—88.5 |

FOREIGN PATENTS 862,099  3/61  Great Britain.

ROY LAKE, *Primary Examiner.*

JOHN KOMINSKI, *Examiner.*